Nov. 9, 1965   G. W. BROWN   3,216,874
CONTAINER MAKING METHODS AND APPARATUS
Filed Jan. 7, 1963   2 Sheets-Sheet 2

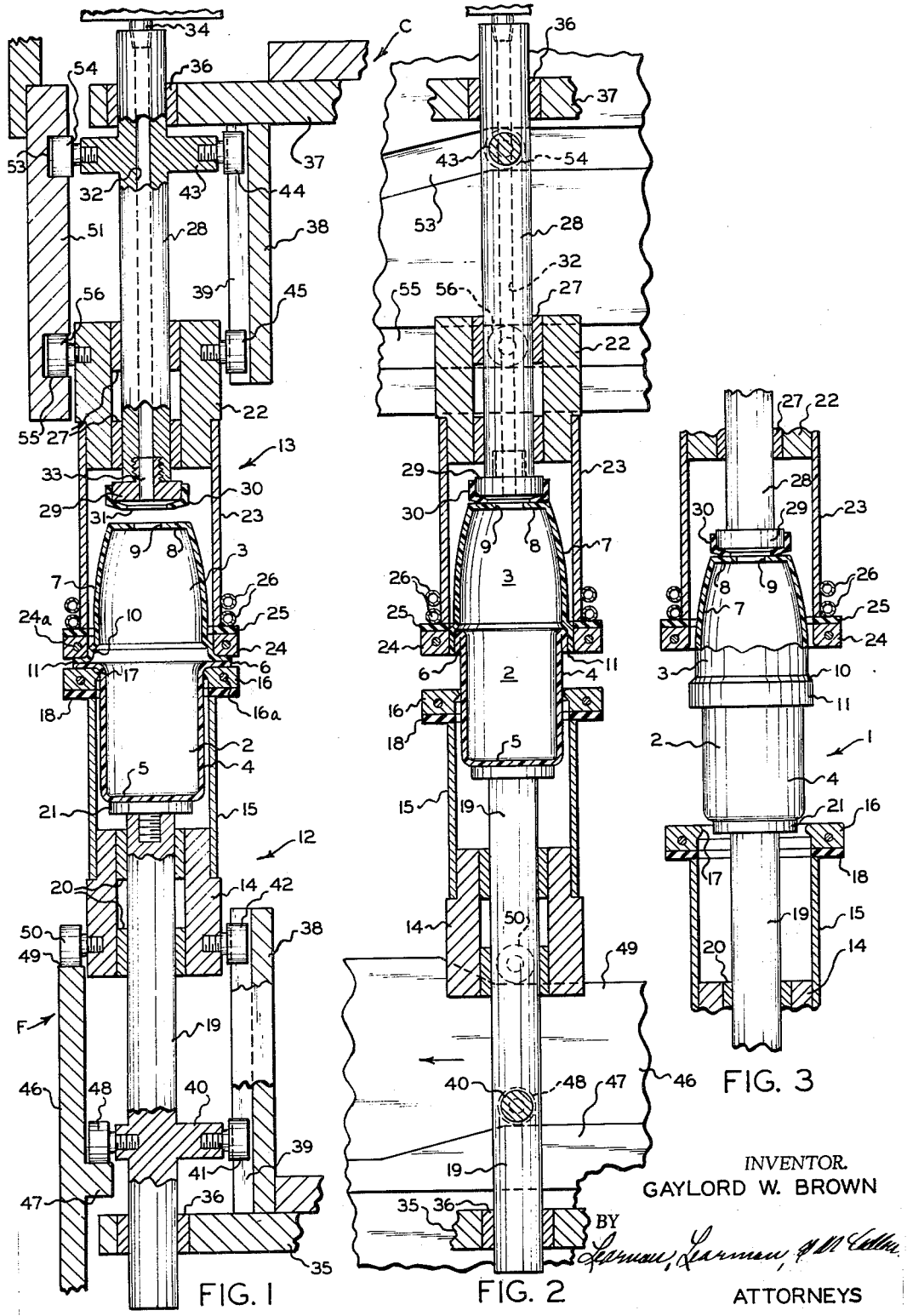

INVENTOR.
GAYLORD W. BROWN
BY
ATTORNEYS

United States Patent Office 3,216,874
Patented Nov. 9, 1965

3,216,874
CONTAINER MAKING METHODS AND
APPARATUS
Gaylord W. Brown, Beaverton, Mich., assignor to Brown Machine Company of Michigan, Inc., a corporation of Michigan
Filed Jan. 7, 1963, Ser. No. 249,848
6 Claims. (Cl. 156—69)

This invention relates to apparatus and methods for making containers of various shapes and more particularly to methods and apparatus for making disposable containers from two halves or parts which can be very inexpensively and rapidly formed separately of plastic material by conventional differential pressure molding methods.

A container formed according to the present invention preferably is constructed from halves which need not be cylindrical and are composed of a thermoplastic, organic, plastic material which is capable of being reheated to a soft, pliable condition and which, when so heated, has an affinity for like material, thereby enabling flanges on the two halves to be bonded to one another and folded over to lie adjacent one of the halves.

Containers of the kind with which the invention is concerned are particularly well adapted for the dispensing of household cleaners, for example. Such containers conventionally are filled with a predetermined quantity of material to be dispensed and, when empty, are usually thrown away. It is important, therefore, that the container be made as inexpensively as possible so as not to add appreciably to the cost of the material that it contains. It has been found that thin walled containers can be molded quite inexpensively from thermoplastic plastics such as polystyrene, polyethylene, and other plastics of similar nature. Such containers can effectively withstand the rigors of filling, labeling, shipping and use, even though the wall section of the container is quite thin.

For ease of manufacture and uniformity of product, it is preferred to form each finished container from two half sections, as observed, and to join the two sections together by fusion or heat welding. In order to fuse or heat weld the two sections together effectively, it is desirable that the adjacent edges of the two half sections be subjected to heat during the fusion process. Such thin wall sections become quite deformable when heated and, unless this characteristic is controlled, a great many of the containers will be unacceptable. It is important, therefore, that provision be made to prevent undesired deformation of the container walls. It is also important that the folded over flanges or edges be firmly pressed against the body of the container.

It is a principal object of the invention to provide a method of the character described in which a differential pressure is utilized to prevent undesired deformation and collapsing of the thin walled sections during the container forming process.

Another object of this invention is to provide apparatus that is particularly adapted for use in uniting a pair of mating thin wall members in the manner indicated to provide a hollow container of most attractive appearance.

Another object of the invention is to provide apparatus of the character described which is operable automatically to effect sealing together of two independent members in a particular manner in which the sealing operation rigidifies the resulting container.

A further object of the invention is to provide apparatus for forming containers having a finished appearance requiring no further operations following the forming operation.

Another object of the invention is to provide an improved method of joining together two thin walled body sections to form a single container with an intermediate reinforcing band.

Other objects and advantages of the invention will be pointed out specifically or will become apparent from the following description when it is considered in conjunction with the appended claims and the accompanying drawings, in which:

FIGURE 1 is a longitudinal, sectional view of apparatus constructed in accordance with the invention and illustrating one stage of the formation of a container;

FIGURE 2 is a view similar to FIGURE 1, but rotated through 90°, and illustrating the apparatus in another more advanced stage of its operation; and FIGURE 3 is a fragmentary, sectional view similar to FIGURE 2 but illustrating the apparatus in a still more advanced stage of its operation;

Figure 4:
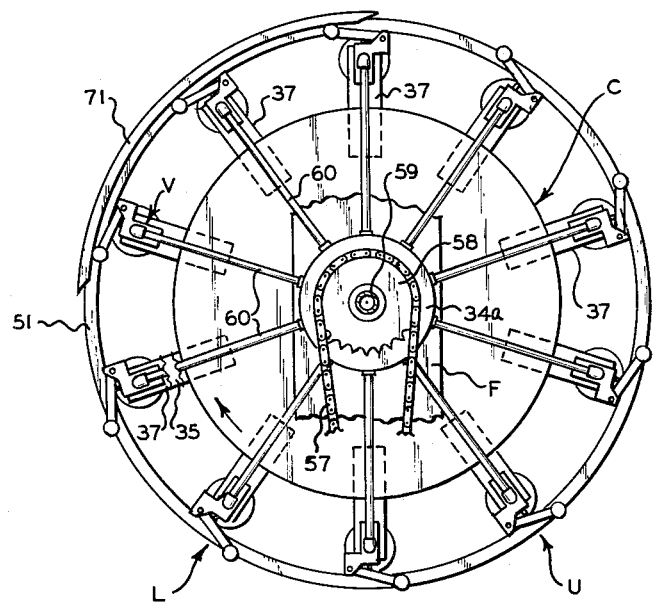
FIGURE 4 is a reduced size, top plan view of a machine which may be employed in the practice of the invention.

The apparatus and method herein described are particularly adapted for the manufacture of a hollow container 1 that is composed of a pair of generally cup-shaped sections 2 and 3 which are individually molded from thermoplastic plastic materials such as polystyrene. The container section 2 includes a side wall 4 and a bottom 5, the side wall 4 terminating in a laterally extending marginal flange 6. The container section 3 also includes a side wall 7 that is of the same configuration and a bottom wall 8 having an opening 9 provided therein during or after the molding process by which the section 3 is formed. Preferably, the opening 9 is punched in the container section 3 after the container 3 is thermoformed and prior to the time it is transported to the mechanism shown and to be described. Adjacent the open end of the section 3, the side wall 7 is preferably outwardly flared as is indicated at 10, the side wall terminating in a laterally directed marginal flange 11.

The body sections 2 and 3 are adapted to be placed in end-to-end relation with the flanges 6 and 11 face-to-face. Thereafter, the flanges 6 and 7 are to be fused to one another and then deformed into overlapping relation with one another and one of the body portions to form the container 1.

Apparatus for effecting the desired operations comprises a pair of opposed, relatively movable, vertically juxtaposed die assemblies 12 and 13 (see FIGURES 1–4). As shown in FIGURE 4, a plurality of upper and lower assemblies 13 and 12, respectively, are arranged in circumferentially spaced relation on a rotating carrier generally designated C which will later be described in detail. Each such pair of assemblies 13 and 12 forms a container during the rotary travel of the carrier C clockwisely from a loading station L to an unloading station U. The assemblies 12 and 13 which perform the method claimed will be described first of all and only one assembly 12 and its superjacent assembly 13 will be described since they are all respectively identical.

Each die assembly 12 comprises an annular body 14 to one end of which is suitably fixed a sleeve 15 having an inner diameter sufficiently large to permit the container section 2 freely to be received therein. At its free end the sleeve 15 is secured to a clamping ring 16 on which the flange 6 may be seated, the ring 16 having a radially inwardly projecting rib 17 which engages the side wall 4 of the section 2. Preferably, the ring 16 is a conventional, electrically powered heater ring incorporating a resistance wire 16a which is connected to a source of electrical energy in a conventional manner. Suitable electrical insulation 18 is interposed between the sleeve 15 and the ring 16.

A reciprocable shaft 19 is slideably mounted in the annular body 14 by means of bearings 20 so as to project through the body 14 into the sleeve 15, and a supporting disk 21 is provided on the projecting end of the shaft 19 for engagement with the bottom wall 5 of the container section 2.

Each die assembly 13 comprises an annular body 22 that is similar to the body 14 and to which is fixed an annular sleeve 23 that is similar to the sleeve 15. The sleeve 23 carries a clamping and heating ring 24 at its free end which is adapted to bear against the flange 11 of the container section 3. The ring 24 is similar to the ring 16, except that it has no rib, and its resistance wire 24a is also conventionally connected to a source of electrical energy. Between the sleeve 23 and the ring 24 is an electrical insulator 25. Preferably, the ring 23 is provided with conventional coolant coils 26 that lie adjacent the ring 24 and are connected to a suitable source of circulated coolant.

Reciprocably mounted in the body 22 by means of bearings 27 is a slideable shaft 28 that projects through the body 22 into the sleeve 23. The projecting end of the shaft 28 is provided with a seating member 29 that is adapted to bear against the bottom wall 8 of the container section 3 and the member 29 is provided with an air seal 30 formed of rubber or other suitable material and having an annular central opening 31 of such size as to completely surround the annular opening 9 formed in the bottom wall 8 of the container section 3. The shaft 28 is longitudinally bored to provide a passage 32, and the member 29 is similarly bored to provide a passage 33 in communication with the passage 32.

The end of the shaft 28 that is remote from the member 29 is so constructed as to receive a coupling member 34 which intermittently communicates with a source of pressure fluid such as the manifold 34a shown in FIGURE 4 mounted on the carrier C in a manner to be described. Preferably, the pressure fluid is compressed air, but other fluid mediums can be utilized.

The rotary carrier C, which includes a lower disk part C', mounts a plurality of lower plates 35 and upper plates 37 arranged above the plates 35, the shafts 19 and 28 being mounted for reciprocation by means of bearings 36 carried by the plates. Fixed to each of the carrier plates 35 and 37 is an upstanding guide member 38 having a guide track 39 formed therein. The shaft 19 of each assembly 12 has a laterally extending boss 40 on which is mounted a guide roller 41 which is rotatably received in one guide track 39, and the surrounding annular body 14 is provided with a guide roller 42 that also is received in the same guide track 39. The arrangement is such as to prevent rotation of the shaft 19 and body 14 during their reciprocating movements.

The shaft 28 of each assembly 13 is provided with a boss 43, similar to the boss 40, which supports a similar guide roller 44 that is received in the adjacent guide track 39. The surrounding body 22 also is provided with a guide roller 45, the members 44 and 45 preventing rotation of the members 22 and 28 during reciprocation thereof.

Means is provided for effecting reciprocation of each shaft 19 and reciprocation of the body and sleeve members 14 and 15, as desired, and comprises a stationary, preferably annular cam 46 that forms part of the stationary machine frame F. The member 46 includes an annular cam track 47 adapted to receive cam followers 48 that are rotatably journaled on the shafts 19 and are forcibly held against the cam track by the weight of the shafts 19. The member 46 also has a cam track 49 formed on its upper surface and against which a cylinder driving cam follower 50 in each assembly 12 bears, the followers 50 being mounted on the body members 14.

Similar means is provided to effect reciprocation of each shaft 28 and reciprocation of the members 22 and 23 and comprises a stationary, annular cam 51 that is supported on the machine frame. The member 51 has a cam groove 53 formed therein for reception of a cam follower 54 that is mounted on each shaft 28. A second cam groove 55 is formed in the member 51 for reception of the cylinder driving follower 56 that is mounted on each body member 22.

Any suitable means can be utilized to effect rotary movement of the carrier C and its sections 35 and 37 relative to the cams 46 and 51. The mechanism indicated for revolving the carrier C comprises a chain 57 trained around a sprocket 58 which is mounted on the suitably journaled vertical shaft 59 to which carrier C is affixed. The chain 57 can be connected to a suitable electric motor through a speed reducer or the like which rotates carrier C slowly at the desired rate of travel. While the container sections 2 and 3 could be manually loaded at station L, and the completed article manually unloaded at station U, preferably mechanical conveyors incorporating star wheels are provided for this purpose. This mechanism is not shown, however, inasmuch as it forms no part of the present invention.

Figure 5:
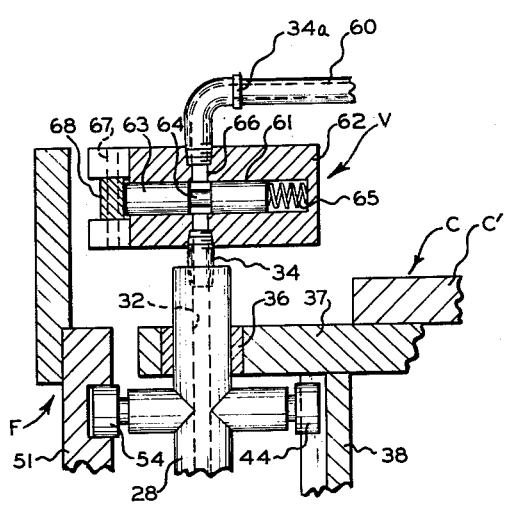
FIGURE 5 is an enlarged, fragmentary, sectional elevational view illustrating mechanism for supplying air under pressure to the container being formed at the proper time.

It has been indicated that the manifold 34a constitutes a source of air under pressure and plainly manifold 34a can be connected with a compressor and accumulator tank in any desired manner. The passage 32 in each shaft 28 is supplied with air under pressure at the proper time via tubes 60 (see FIGURES 4–6) and valves generally designated V. In each valve V is a horizontal bore 61 provided in its valve housing 62 to receive a valve spindle 63 with a reduced portion 64, there being a spring 65 in the end of the housing 62 which normally urges the spindle 63 outwardly sufficiently so that the spindle 61 blocks the flow of air through the vertical passage 66 which is provided in the housing 62 intersecting the bore 61. An elbow coupling member 34a connects the passage 61 in each valve V with the vertical passage 66 therein as shown.

Figure 6:
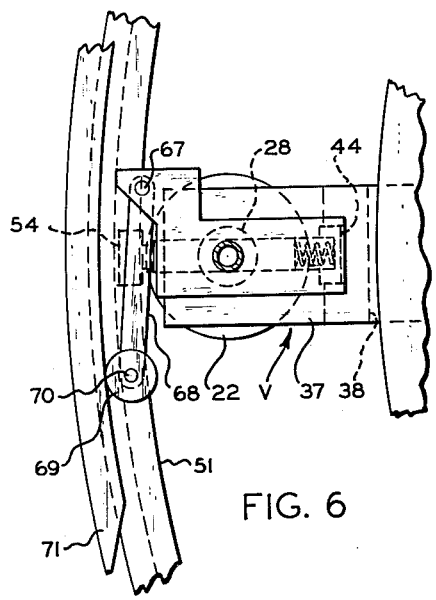
FIGURE 6 is a top plan view thereof.

Pivotally mounted on each housing 62, as at 67 (see FIGURE 6), is an arm 68 having a follower roller 69 rotatably secured to its outer end, as at 70, and, as shown in FIGURES 4 and 6, a stationary cam track 71 mounted by the frame F in any suitable manner is provided to depress arm 68 and depress valve spindle 63 accordingly to admit air to the passage 32 of each assembly 13 at the desired time.

In operation, the carrier sections 35 and 37 are continuously moved relative to cams 46 and 51 and in the first place are in such positions as to cause the die assemblies 12 and 13 to be spaced apart from one another a distance sufficient to permit the container sections 2 and 3 to be automatically or manually inserted in their respective die assemblies with the marginal flanges 6 and 11 opposed. The ensuing movement of sections 35 and 37 is such as to effect relative movement of the body members 14 and 22 toward one another so as to move the sections 2 and 3 into abutting relation as in FIGURE 1 and cause the clamping rings 16 and 24 to bear forcibly against their respective flanges 6 and 11. In these positions of the parts, the electric current which may be constantly flowing through the rings 16 and 24 is such as to provide sufficient heat to the rings 16 and 24 to heat the flanges 6 and 11 to a deformable and fusible state. The force with which the rings 16 and 24 bear on the flanges 6 and 11 is sufficient to provide a heat weld so as to fuse the flanges to one another.

Either during or following the heating process, the cam track 53 will cause the shaft 28 of each assembly 13 as it is rotated to be moved relative to the body member 22 so as to effect sealing engagement between the top wall 8 of the container section 3 and the seating member 29 that is supported on the shaft 28. At this time the cam 71 depresses the arm 68 and valve spindle 63 to admit air under pressure to passage 32. Thereafter, continued movement of the carrier sections 35 and 37 relative to cam tracks 47 and 49 effects conjoint movement of the shafts 19 and 28 upwardly relative to the respective sleeves 15 and 23 so as to cause the container sections 2 and 3 to be pushed into the sleeve 23 as in FIGURE 2. As the container sections 2 and 3 are pushed into the sleeve 23, the flanges 6 and 11 are deformed into overlapping relation with one another and with the side wall 4 of the body section 2. The outward flaring of the wall 7 of the container section 3 facilitates overlapping of walls 3 and 4. Following the deformation of the flanges, coolant may be circulated through the coils 26 to accelerate the cooling of the heated portions of the container sections.

The air or other pressurizing medium exerts an outward force on the heat softened wall portions of the container sections 2 and 3 adjacent flanges 6 and 11 during the time they are moved from the position of FIGURE 1 to the position of FIGURE 2 to prevent them from collapsing. With some materials the differential pressure may enable formation of a bond between the flange 6 and adjacent side wall 4. Preferably, the air is introduced just after the container sections commence to move up into sleeve 23 to deform the flanges 6 and 11 but in one embodiment of the invention, when the thickness of the walls of the sections is sufficient to prevent their collapse, the air may be introduced just after the sections have completed their movement up into sleeve 23.

Following the completion of the sealing and deforming operations, further rotary movement of the sections 35 and 37 relative to cams 46 and 51 effects relative movement between the shaft 19 and the sleeve 15 and relative movement between the sleeve 23 and the shaft 28 so as to permit discharge of the container from the respective die assemblies. At this time, just before seal 30 is moved upwardly from the top of the container formed, the cam 71 terminates and the valve spring 65 moves the spindle 63 to close off valve passage 66. The process is clearly well suited to the continuous production of containers.

The pressure within the container during its forming process will depend in large part on the wall thickness of the container and obviously should be of insufficient magnitude to rupture the walls of the container. A pressure on the order of 5 p.s.i. is quite satisfactory.

A container formed according to the disclosure has a triple thickness wall adjacent the center of the container, thereby providing considerable strength and rigidity to the container.

The disclosure is intended to be illustrative rather than definitive of the invention. The invention is defined in the claims.

What is claimed is:

1. The method of forming a container from two thermoplastic, generally cup-shaped, hollow members, each of which has a side wall with a laterally projecting marginal flange at an open end, one of said members having an opening through its opposite end; said method comprising: positioning said members in end-to-end relation with the flanges facing one another; heating said flanges to a deformable and weldable state; and introducing fluid under pressure through said opening, while otherwise sealing said opening, and pressing said flanges into lapped relation with the side wall of one of the members to heat seal the flanges thereto and provide a reinforced band at the juncture of the members.

2. The combination defined in claim 1 in which said flanges are pressed together while being heated and the cup-shaped member to which the flanges are not joined is cooled in the region adjacent the flange.

3. Apparatus for forming a container from two generally cup-shaped members having side and end walls, the side wall of each member terminating at one end in a laterally extending marginal flange, and a wall of one of said members having an opposite end opening therethrough, said apparatus comprising: frame means; means thereon for supporting said members in axial alignment with the flanges thereof in overlying, contiguous relation; flange gripping means supported by said frame means for holding said flanges in contiguous relation; means for heating said flanges to a deformable state; motion transmitting means for effecting simultaneous relative movement of said member supporting means and said flange gripping means to move said contiguous flanges into overlapping relation with a side wall of one of said members; fluid pressure delivery means having a sealing surface; means for relatively moving said sealing surface and supporting means for said members to bring said sealing surface into sealed relation with the wall having the opening; and means operable to introduce a fluid under pressure through said fluid pressure delivery means to said opening to pressurize the interior of said members and help to seal said flanges to said side wall of one of said members and form a reinforced band on said container.

4. The combination defined in claim 1 in which means is provided for cooling the cup-shaped member to which the flanges are not joined in the region adjacent the flange.

5. The combination defined in claim 1 in which carrier means support said means for supporting said members in axial alignment; means for moving said carrier means through a path of travel; a source of fluid under pressure; cam means adjacent the path of travel of said carrier means; means connecting said source and fluid pressure delivery means; and means normally preventing the passage of fluid to said fluid delivery means actuated by said cam means to release fluid thereto.

6. Apparatus for forming a container from two generally cup-shaped members each having side and end walls, the side wall of each member terminating in a laterally extending marginal flange, and an end wall of one of said members having an opening therein, said apparatus comprising: frame means; means thereon for supporting said members in axial alignment with the flanges thereof in overlying, contiguous relation; flange gripping means supported by said frame means for holding said flanges in contiguous relation; means for heating said flanges to a deformable and weldable state; motion transmitting means for effecting simultaneous relative movement of said member supporting means and said flange gripping means to move said contiguous flanges into overlapping relation with a side wall of one of said members; fluid pressure delivery means having a sealing surface of greater perimetral size than said opening in the one member; means for relatively moving said sealing surface and supporting means for said members to bring said sealing surface into surrounding sealed relation with the wall having the opening; and means operable to introduce a fluid under pressure through said fluid pressure delivery means to said opening to pressurize the interior of said members and help to seal said flanges to said side wall of one of said members and form a reinforced band on said container.

References Cited by the Examiner

UNITED STATES PATENTS

| | | | |
|---|---|---|---|
| 2,956,611 | 10/60 | Jendrisak et al. | 156—73 |
| 3,054,440 | 9/62 | Pio | 156—204 |
| 3,059,810 | 10/62 | Edwards | 264—294 |
| 3,062,695 | 11/62 | Hull | 156—306 |
| 3,078,912 | 2/63 | Hitzelberger | 156—73 |
| 3,152,944 | 10/64 | Mojonnier et al. | 156—228 |

FOREIGN PATENTS 609,758  11/60  Canada.

ALEXANDER WYMAN, *Primary Examiner.*

EARL M. BERGERT, *Examiner.*